126,461

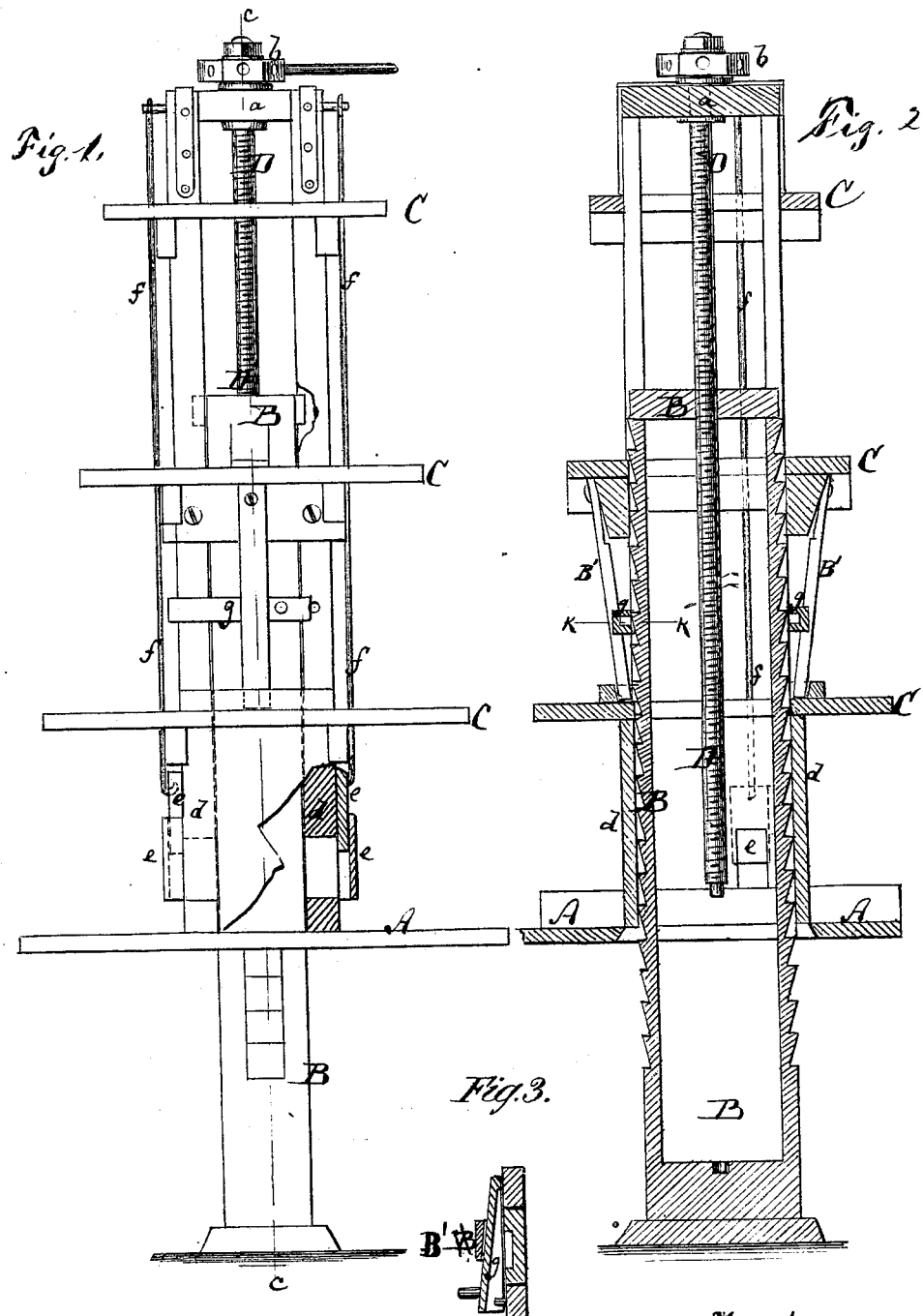

UNITED STATES PATENT OFFICE.

JUSTIN JACOBS, OF WEST SALEM, WISCONSIN.

IMPROVEMENT IN APPARATUS FOR ELEVATING AND IMMERSING VESSELS.

Specification forming part of Letters Patent No. 126,461, dated May 7, 1872.

Specification describing a new and Improved Elevator and Immerser for Vessels, invented by JUSTIN JACOBS, of West Salem, in the county of La Crosse and State of Wisconsin.

Figure 1 represents a side elevation, partly in section, of my improved apparatus. Fig. 2 is a vertical section of the same on the line $c\ c$, Fig. 1; and Fig. 3 is a detail horizontal section on the line $k\ k$, Fig. 2.

Similar letters of reference indicate corresponding parts.

This invention relates to a new device for application to river-steamers, canal-boats, and other vessels, and has for its object to prevent their sinking in case of a dangerous leak, and to cause their submersion in case of fire. The invention consists in the arrangement of vertical slides, which extend through the bottom of the vessel, and are let down to serve as supports for the same on the ground whenever there is danger of the vessel sinking. The invention also consists in the combination of these elevators with gates, which, when opened, let water into the vessel to sink it in case of fire.

A in the drawing represents the bottom of the vessel. B is a vertical slide, extending through the bottom and through the several decks C C to suitable height. D is a vertical screw, which is swiveled in a block, $a$, above the hurricane-deck, and connected at its upper end with a capstan, $b$, or equivalent device, whereby it can be turned. The screw D fits through the upper end of the slide B, which is threaded to receive it, so that by turning the screw the slide will be moved up or down. Between the ship's bottom and the deck next above the slide is securely inclosed by a casing, $d$, which prevents water from entering the vessel through the aperture in the bottom.

Whenever the ship, by striking a snag or otherwise, springs a leak, and is in danger of sinking, the two or more slides B, with which it is provided, are let down to support it on the ground and prevent sinking. It can then be conveniently repaired, after which the slides B are drawn up to set it again afloat.

In the sides of the case $d$ are apertures closed by gates $e\ e$, which connect with upwardly-extending rods $f\ f$. Whenever the ship takes fire, and is in danger of being entirely burnt, the gates $e$ are drawn up and the apertures in $d$ opened to let water into the vessel for submerging it. The slide should be let slightly down to open the aperture in the bottom of the vessel before the gates are opened. The sides of the slide may be notched or toothed, as shown, for the reception of laterally-adjustable spring-pawls B', operated by wedges $g\ g$, which help to support the vessel on the lowered slides and relieve the screw D from strain.

Having thus described my invention, I claim as new and desire to secure by Letters Patent—

1. The vertical frame B, adjustable through the decks and bottom in a water-tight case, $d$, as described, for the purpose of supporting the vessel above the surface of the water in case of a leak.

2. The combination, with vertically-sliding frame B, of case $d$, having one or more apertures closed by the sliding gates $e\ e$, as described, for the purpose of enabling the vessel to be flooded with water in case of fire.

JUSTIN JACOBS.

Witnesses:
   A. J. PHILIPS,
   E. M. PHILIPS.